(12) United States Patent
Ogata et al.

(10) Patent No.: US 8,269,766 B2
(45) Date of Patent: Sep. 18, 2012

(54) METHOD FOR GENERATING THREE-DIMENSIONAL SHAPE DATA, APPARATUS FOR GENERATING THREE-DIMENSIONAL SHAPE DATA, AND THREE-DIMENSIONAL SHAPE DATA GENERATING PROGRAM

(75) Inventors: Yoshinori Ogata, Nagoya (JP); Ikujiro Kozen, Toyota (JP)

(73) Assignees: Toyota Jidosha Kabushiki Kaisha, Toyota-shi (JP); Ikujiro Kozen, Toyota (JP)

( * ) Notice: Subject to any disclaimer, the term of this patent is extended or adjusted under 35 U.S.C. 154(b) by 1184 days.

(21) Appl. No.: 12/091,118

(22) PCT Filed: Dec. 26, 2006

(86) PCT No.: PCT/IB2006/003764
§ 371 (c)(1),
(2), (4) Date: Apr. 22, 2008

(87) PCT Pub. No.: WO2007/074377
PCT Pub. Date: Jul. 5, 2007

(65) Prior Publication Data
US 2008/0246762 A1    Oct. 9, 2008

(30) Foreign Application Priority Data
Dec. 28, 2005  (JP) ................. 2005-379585

(51) Int. Cl.
*G06T 15/00*    (2011.01)
*G06T 17/00*    (2006.01)

(52) U.S. Cl. ........................ 345/419; 345/420

(58) Field of Classification Search .......... 345/419, 345/420
See application file for complete search history.

(56) References Cited

U.S. PATENT DOCUMENTS

| 6,700,578 | B2 * | 3/2004 | Kamata et al. | 345/473 |
| 2004/0153824 | A1 * | 8/2004 | Devarajan et al. | 714/38 |
| 2004/0236561 | A1 * | 11/2004 | Smith et al. | 703/22 |
| 2007/0176928 | A1 * | 8/2007 | Matsumoto et al. | 345/427 |

FOREIGN PATENT DOCUMENTS

| EP | 0 596 518 | 5/1994 |
| JP | 3-286377 | 12/1991 |
| JP | 6 149943 | 5/1994 |

(Continued)

OTHER PUBLICATIONS

Wolfe W. et al., "Locating Known Objects in 3-D From a Single Perspective View", SPIE, Intelligent Robots and Computer Vision: Seventh in a Series, vol. 1002, pp. 550-566, XP009084445, 1998.

(Continued)

*Primary Examiner* — Jeffrey Chow
(74) *Attorney, Agent, or Firm* — Oblon, Spivak, McClelland, Maier & Neustadt, L.L.P.

(57) ABSTRACT

A placement position of a sketched image into a three-dimensional space and viewing point direction are determined using the angle method or the three-point method, and the cross-section lines of a door cross-section line and center cross-section line of a vehicle depicted in the sketched image is determined and, based on the obtained cross-section line and center cross-section line, a spatial curved surface of the vehicle in the three-dimensional space is determined, distortion is corrected, and a curved surface is created.

31 Claims, 16 Drawing Sheets

SPATIAL CURVED LINE CREATION
• A SWEPT SURFACE IS CREATED FROM A GENERATED CROSS-SECTIONAL OUTER CONTOUR LINE, AND A LINE OF THE SKETCHED IMAGE IS PROJECTED ONTO THAT SURFACE FROM THE VIEWING POINT DIRECTION.

CREATE A VIRTUAL SURFACE FROM A CROSS-SECTIONAL OUTER CONTOUR LINE

PROJECT CHARACTER LINE OF THE SKETCHED IMAGE

FOREIGN PATENT DOCUMENTS

| | | |
|---|---|---|
| JP | 6 301751 | 10/1994 |
| JP | 7-49965 | 2/1995 |
| JP | 7-134779 | 5/1995 |
| JP | 10-508715 | 8/1998 |
| JP | 10 269380 | 10/1998 |
| JP | 2000-76453 | 3/2000 |
| JP | 2004 206262 | 7/2004 |
| JP | 2005-77385 | 3/2005 |

OTHER PUBLICATIONS

Thompson D. W. et al., "Three-Dimensional Model Matching From an Unconstrained Viewpoint", IEEE, vol. 1, pp. 208-220, XP000013297, 1987.

Fischler M. A. et al., "Random Sample Consensus: A Paradigm for Model Fitting With Applications to Image Analysis and Automated Cartography", Communications of the ACM, vol. 24, No. 6, pp. 381-395, XP001149167, 1981.

Nelson R. N. et al, "Determining Three-Dimensional Object Shape and Orientation From a Single Perspective View", Optical Engineering, vol. 25, No. 3, pp. 394-401, XP009084415, 1986.

Wolfe W. J. et al., "The Perspective View of Three Points", IEEE. Transactions on Pattern Analysis and Machine Intelligence, vol. 13, No. 1, [ages 66-73, XP009084623, 1991.

Tan T. N., "Recovering 3D Bilateral Symmetric Objects From a Single Perspective", SPIE, vol. 2753, pp. 139-147, XP009084622, 1996.

Kodera, T. et al, "Intelligent Environment by Seamless Combination of 2D and 3D Image for Design Work", IBM Power, vol. 4, No. 6, 791-796, 1999.

Satoshi Kanai, et al., "Generation of Free-Form Surface Models by Understanding Geometric and Topological Constraints on Rough Sketches", IEEE International Conference on Systems Engineering, IEEE Catalog No. 92CH3179-9, XP-000343389, Sep. 17-19, 1992, pp. 246-249 with an additional page.

\* cited by examiner

ANGLE METHOD: TWO-AXIS METHOD

AXIS 1 SW-tan (tx1, ty1, tz1)
AXIS 2 SL-tan (tx2, ty2, tz2)
POINT P0 (x1, y1, z1)
POINT P1 (x2, y2, z2)

⇒

DETERMINE ORTHOGONAL SPACE BY TWO AXES
DETERMINE ORIGIN POINT BY ONE POINT
DETERMINE DISTANCE BETWEEN TWO POINTS

FIG. 6
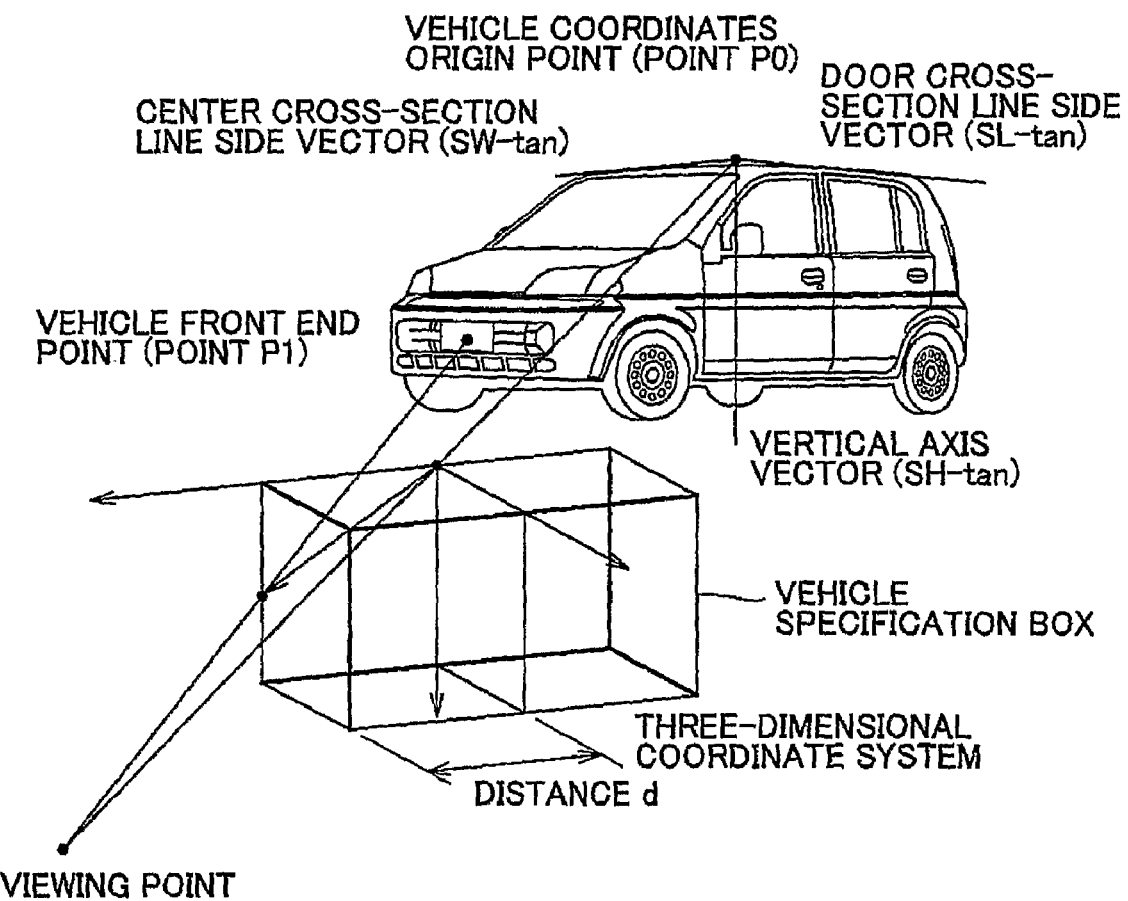
ANGLE METHOD: THREE-AXIS METHOD
AXIS 1 SW-tan (tx1, ty1, tz1)
AXIS 2 SL-tan (tx2, ty2, tz2)
AXIS 3 SH-tan (tx3, ty3, tz3)
POINT P0 (x1, y1, z1)
POINT P1 (x2)
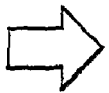
DETERMINE ORTHOGONAL SPACE BY THREE AXES
DETERMINE ORIGIN POINT BY ONE POINT
DETERMINE DISTANCE ON 1 FLAT PLANE
(1-AXIS DISTANCE)

THREE POINT METHOD: FIXED THREE-POINT METHOD

POINT P0 (x1, y1, z1)
POINT P1 (x2, y2, z2)
POINT P2 (x3, y3, z3)

⇒ DETERMINE VIEWING POINT POSITION AND COORDINATES BY THREE POINTS

FIG. 10

●NAMES OF VARIABLES

| MEANING | | NAME |
|---|---|---|
| VIEWING POINTS (COMMON TO QV AND 3D) | | Ep |
| 3D | TOTAL HEIGHT POINT, ON INTERSECTING LINE BETWEEN SL CROSS-SECTION AND SW CROSS-SECTION | P0 |
| | TANGENT LINE OF P0 ON SW CROSS-SECTION; NOT NECESSARILY HORIZONTAL | Wtan |
| | TANGENT LINE OF P0 ON SL CROSS-SECTION; NOT NECESSARILY HORIZONTAL | Ltan |
| | P2 | P2 |
| QV | POINT CORRESPONDING TO 3D P0 | p0 |
| | LINE CORRESPONDING TO 3D Wtan | wtan |
| | LINE CORRESPONDING TO 3D Ltan | ltan |
| | POINT CORRESPONDING TO 3D P2 | p2 |
| wtan DIRECTIONAL VECTOR (NORMALIZED) | | $\vec{\nu}_w$ |
| ltan DIRECTIONAL VECTOR (NORMALIZED) | | $\vec{\nu}_l$ |
| Ep → p0 DIRECTED VIEWING LINE VECTOR (NORMALIZED) | | $\vec{\nu}_e$ |
| Ep → p2 DIRECTED VECTOR (NORMALIZED) | | $\vec{\nu}_2$ |
| Wtan DIRECTIONAL VECTOR (NORMALIZED) | | $\vec{V}_W$ |
| Ltan DIRECTIONAL VECTOR (NORMALIZED) | | $\vec{V}_L$ |
| ANGLE FORMED BY $\vec{\nu}_w$ AND $\vec{\nu}_e$ | | $\theta_w$ |
| ANGLE FORMED BY $\vec{\nu}_l$ AND $\vec{\nu}_e$ | | $\theta_l$ |
| ANGLE FORMED BY $\vec{\nu}_w$ AND $\vec{\nu}_l$ | | $\theta_{wl}$ |
| DISTANCE BETWEEN P0 AND P2 | | d |
| ANGLE FORMED BY $\vec{\nu}_e$ AND $\vec{\nu}_2$ | | $\theta_{e2}$ |
| ANGLE FORMED BY $\vec{\nu}_l$ AND $\vec{\nu}_2$ | | $\theta_{l2}$ |

FIG. 11

●RESTRAINING CONDITIONS (a) Wtan AND wtan APPEAR TO OVERLAP (REGARDLESS OF THE VECTOR LENGTH), THAT IS, Wtan IS ON THE PLANE WHICH CONTAINS Ep, wtan(, p0).

(b) Ltan AND ltan APPEAR TO OVERLAP (REGARDLESS OF THE VECTOR LENGTH), THAT IS, Ltan IS ON THE PLANE WHICH CONTAINS Ep, ltan(, p0).

(c) P0 AND p0 APPEAR TO OVERLAP, THAT IS, P0 IS ON THE EXTENSION OF THE LINE JOINING Ep AND p0.

(d) P2 AND p2 APPEAR TO OVERLAP, THAT IS, P2 IS ON THE EXTENSION OF THE LINE JOINING Ep AND p2.

FIG. 12

●THREE-AXIS METHOD

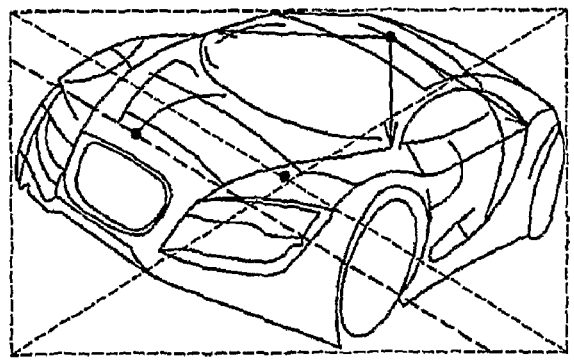

| | ITEM | INPUT | OUTPUT |
|---|---|---|---|
| INPUTS/OUTPUTS | SCREEN POINT P0 | ○ | |
| | THREE ORTHOGONAL SCREEN AXES | ○ | |
| | SCREEN LINE 1 | ○ | |
| | 3D POINT P0 | ○ | |
| | 3D THREE ORTHOGONAL AXES | ○ | |
| | 3D POINT P1 | ○ | |
| | VIEWING ANGLE | ○ | |
| | 3D-QV TRANSFORMATION MATRIX | | ○ |

●VARYING THREE-POINT METHOD

| | ITEM | INPUT | OUTPUT |
|---|---|---|---|
| INPUTS/OUTPUTS | SCREEN POINT P0 | O | |
| | SCREEN LINE 1 (OVERLAPS WITH POINT P1 AND END VECTOR) | O | |
| | SCREEN LINE 2 (OVERLAPS WITH POINT P2 AND ROCKER VECTOR) | O | |
| | 3D POINT P0 | O | |
| | 3D POINT P1 | O | |
| | 3D POINT P2 | O | |
| | VIEWING ANGLE | O | |
| | 3D-QV TRANSFORMATION MATRIX | | O |

FIG. 20
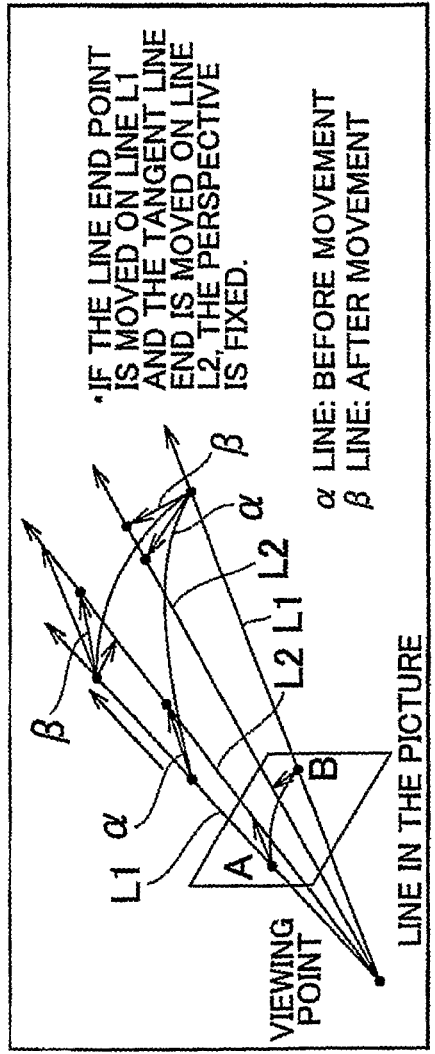
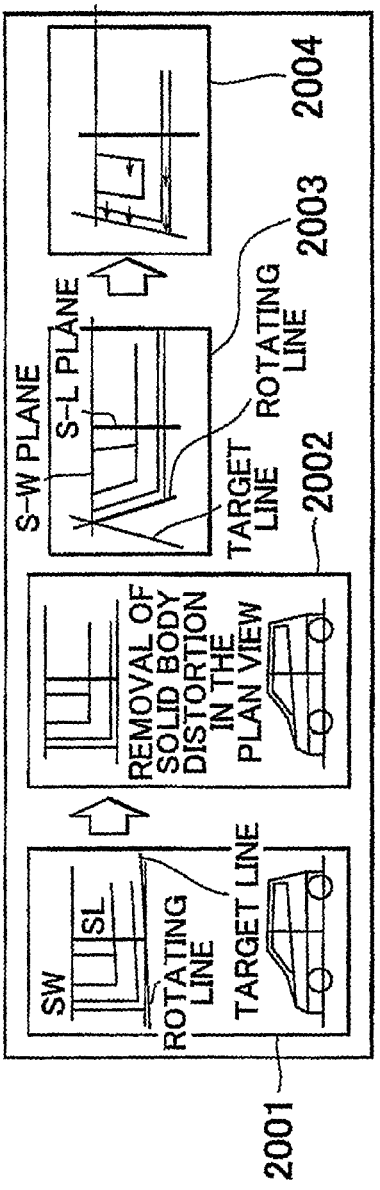

METHOD FOR GENERATING THREE-DIMENSIONAL SHAPE DATA, APPARATUS FOR GENERATING THREE-DIMENSIONAL SHAPE DATA, AND THREE-DIMENSIONAL SHAPE DATA GENERATING PROGRAM

BACKGROUND OF THE INVENTION

1. Field of the Invention

The present invention relates to a method for generating three-dimensional shape data, an apparatus for generating three-dimensional shape data, and a program for generating three-dimensional shape data of a three-dimensional object from a sketch of the three-dimensional object made by a designer or the like.

2. Description of the Related Art

Various methods have been described for generating three-dimensional shape data from a hand-drawn sketch by a designer or the like. For example, Japanese Patent Application Publication No. JP-A-6-149943, for example, describes a method for generating three-dimensional shape data from a perspective view (sketch) of the three-dimensional object on which cross-section lines are drawn by cutting the object with predetermined planes, and determining flat plane equations representing flat planes in a three-dimensional space in an orthogonal coordinate system from vanishing points and the like on the flat surfaces with respect to the perspective view, and then projecting the cross-section lines onto the flat planes represented by the flat plane equations.

Furthermore, Japanese Patent Application Publication No. JP-A-2004-206262, for example, describes a method of generating three-dimensional data by reading in a perspective view formed by a plurality of hand-drawn sketches and performing data processing.

In these examples, although the sketch drawn by a designer or the like has mathematically inaccurate perspective, three vanishing points are determined and the viewing point position and three-dimensional space are defined on the assumption that the perspective is correct. Thus, using the three-dimensional space defined in this matter, there is (1) a method of synthesizing a solid body using triangulation surveying from sketches from a plurality of different viewing line directions (views), (2) a method of creating a solid body by searching three-dimensional shape data similar to the perspective and adjusting to the perspective by deforming similar three-dimensional shape data using a neural network or the like, and (3) a method of synthesizing lines of the perspective with a single view made using a CAD (computer-aided design) method. These are described, for example, in Japanese Patent Application Publication No. JP-A-6-149943, Japanese Patent Application Publication No. JP-A-2004-206262, and also in Japanese Patent Application Publication No. JP-A-6-301751 and Japanese Patent Application Publication No. JP-A-10-269380.

A sketch made by a designer or the like is not drawn in accordance with an accurate orthogonal coordinate system. For this reason, the coordinate system of the sketch often has overall distortion in accordance with the image of the designer or the like. As described above, therefore, if three-dimensional shape data is generated in a three-dimensional space in an orthogonal coordinate system, there are cases in which the intent of the designer or the like is not reflected in the three-dimensional shape data.

That is, in the above-noted related art, the sketch made by the designer has mathematically inaccurate perspective. In the related art, however, the three-dimensional shape data is generated by searching for the optimal perspective for the case in which the sketch is viewed in the three-dimensional space, on the assumption that the sketch is a representation with accurate perspective. However, the sketch is not represented with accurate perspective. For this reason, in the above-noted related art there is the problem of three-dimensional shape data being generated that does not reflect the concept and the image of the designer as represented in the sketch.

In the above-described related art, although the three vanishing point method is used with regard to the definition of the coordinate system, because there is no vanishing point in the sketch, if the three vanishing point method is used, a large error occurs between the sketch and the three-dimensional shape data. For this reason, there is the problem of not being able to acquire three-dimensional shape data from a single sketch.

Also, because the structure represented by the lines of the sketch has no concept of a solid configuration, there is the problem of cases in which the solid body as seen in the sketch cannot be formed with three-dimensional shape data. Also, because the work flow of the method of generating three-dimensional shape data from a sketch is separate from the design work, there is the problem of it not being possible to correct and deform the three-dimensional shape data as the evaluation of the sketched design proceeds.

SUMMARY OF THE INVENTION

The present invention provides a method for generating three-dimensional shape data, an apparatus for generating three-dimensional shape data, and a three-dimensional shape data generating program that are capable of generating three-dimensional shape data that reflects the intent and image of a designer.

A first aspect of the present invention relates to a method for generating three-dimensional shape data. The method includes inputting a specification of a sketched image; reading in the sketched image as image data; creating data in two-dimensional coordinates from lines included in the read-in image; mutually associating a prescribed value set in the sketched image and a prescribed value in a three-dimensional space defined in a computer, and determining a placement position in the three-dimensional space of the sketched image and a viewing point position with respect to the image, so that the input specification is satisfied; mapping a cross-sectional line of the sketched image into the three-dimensional space and creating a cross-sectional outer contour line in the three-dimensional space, based on the placement position and the viewing point position; creating a line, included in the sketched image from which data is created, as a curved line in the three-dimensional space, using the cross-sectional outer contour line in the three-dimensional space; correcting distortion of the created spatial curved line; and creating a curved surface based on the created spatial curved line.

In the method for generating three-dimensional shape data according to the first aspect of the present invention, the determining step may be carried out by one of either an angle method, whereby coordinate axes set in each of the sketched image and the three-dimensional space are mutually associated, or a three-point method, whereby three points set in each of the sketched image and the three-dimensional space are mutually associated.

In the method for generating three-dimensional shape data according to the first aspect of the present invention, the creation of a spatial curved line includes the creation of a virtual surface by moving the cross-sectional outer contour line, and projecting a line included in the sketched image onto the virtual surface from the viewing point direction.

A second aspect of the present invention relates to an apparatus for generating three-dimensional shape data. The apparatus includes an inputting unit for inputting a specification of a sketched image; a reading unit that reads in the sketched image as image data; a data-creating unit that creates data in two-dimensional coordinates from lines included in the read-in image; a determining unit that mutually associates a prescribed value set in the sketched image and a prescribed value in a three-dimensional space defined in a computer, and determines the placement position in the three-dimensional space of the sketched image and a viewing point position with respect to the image, so that the input specification is satisfied; a cross-section creating unit that maps a cross-sectional line of the sketched image into the three-dimensional space and creates a cross-sectional outer contour line in the three-dimensional space, based on the placement position and the viewing point position; a spatial curved line creating unit that creates a line, included in the sketched image from which data is created, as a curved line in the three-dimensional space, using the cross-sectional outer contour line in the three-dimensional space; a distortion-correcting unit that corrects distortion of the created spatial curved line; and, a curved surface creating unit that creates a curved surface based on the created spatial curved line.

In the apparatus for generating three-dimensional shape data according to the second aspect of present invention, the determining unit executes determining processing using one of an angle method whereby coordinate axes set in each of the sketched image and the three-dimensional space are mutually associated and a three-point method whereby three points set in each of the sketched image and the three-dimensional space are mutually associated.

In the apparatus for generating three-dimensional shape data according to the second aspect of the present invention, the spatial curved line creating unit includes a virtual surface creating unit that creates a virtual surface by moving the cross-sectional outer contour line and a projector for creating the spatial curved line by projecting a line included in the sketched image onto the virtual surface from the viewing point direction.

A third aspect of the present invention relates to a three-dimensional shape data generating program executed by a computer. The program includes an inputting function that inputs a specification of a sketched image; a reading function that reads in the sketched image as image data; a data-creating function that creates data in two-dimensional coordinates from lines included in the read-in image; a determining function that mutually associates a prescribed value set in the sketched image and a prescribed value in a three-dimensional space defined in a computer, and determines a placement position in the three-dimensional space of the sketched image and a viewing point position with respect to the image, so that the input specification is satisfied; a cross-section creating function that maps a cross-sectional line of the sketched image into the three-dimensional space and creates a cross-sectional outer contour line in the three-dimensional space, based on the placement position and the viewing point position; a spatial curved line creating function that creates a line, included in the sketched image from which data is created, as a curved line in the three-dimensional space, using the cross-sectional outer contour line in the three-dimensional space; a distortion-correcting function that corrects distortion of the created spatial curved line; and a curved surface creating function that creates a curved surface based on the created spatial curved line.

In the program for generating three-dimensional shape data according to the third aspect of the present invention, the determining function determines processing may be implemented using one of either an angle method, whereby coordinate axes set in each of the sketched image and the three-dimensional space are mutually associated, and a three-point method, whereby three points set in each of the sketched image and the three-dimensional space are mutually associated.

In the program for generating three-dimensional shape data according to the third aspect of the present invention, the spatial curved line creating function includes a virtual surface creating function for creating a virtual surface by moving the cross-sectional outer contour line, and a projecting function for creating the spatial curved line by projecting a line included in the sketched image onto the virtual surface from the viewing point direction.

According to the above-noted aspects of the present invention, it is possible to acquire the three-dimensional shape data needed to create a three-dimensional shape from a single sketched image, rather than a plurality of sketched images.

Also, according to the above-noted aspects, because three-dimensional shape data is acquired using cross-section lines of a sketched image, the image of the sketch is reflected in the three-dimensional shape data, and it is possible to create three-dimensional shape data in accordance with the image and intent of the designer or the like.

Also, according to the above-noted aspects, because the specifications of a vehicle to be made are defined and the image of a sketch made to agree with those specifications is turned into three-dimensional shape data, the specifications and the generated three-dimensional shape data are in accurate correspondence, and it is possible to propose specifications enable implementation of an attractive design.

Also, according to the above-noted aspects, because three-dimensional shape data may be created from the image of a sketch, it is possible to naturally synthesize the image of a three-dimensional sketch into a background photograph image. According to the above-noted aspects, because it is possible to transform a two-dimensional image into a three-dimensional image, it is possible to easily transform an animation character into three-dimensional form.

In this manner, according to the above-noted aspects of the present invention it is possible to transform a design sketch to three-dimensional form with speed and accuracy greater than that possible with prior CAD techniques. According to the above-noted aspects, because it becomes possible to achieve high-accuracy viewing point searching for perspective within a three-dimensional space defined within a computer, it is possible to accurately establish the perspective viewing point position generated by computer graphics and the viewing point position of the image of an actual vehicle, and to easily synthesize these images.

BRIEF DESCRIPTION OF THE DRAWINGS

The foregoing and further objects, features, and advantages of the invention will become apparent from the following description of example embodiments with reference to the accompanying drawings, wherein like numerals are used to represent like elements and wherein:

FIG. 6 is a simplified drawing of operation of the three-axis method in the embodiment of a method for generating three-dimensional shape data according to the present invention;

FIG. 10 is a table of names of variables used in the algorithm of the two-axis method in the embodiment of a method for generating three-dimensional shape data according to the present invention;

FIG. 11 is a table of the restraining conditions in the embodiment of a method for generating three-dimensional shape data according to the present invention;

FIG. 12 is a simplified drawing showing the three axes and the one point defined in the sketch in the three-axis method in the embodiment of a method for generating three-dimensional shape data according to the present invention;

FIG. 20 is a simplified drawing of the operation of correcting solid body distortion in the embodiment of a method for generating three-dimensional shape data according to the present invention.

DETAILED DESCRIPTION OF THE EMBODIMENTS

Example embodiments of the present invention are described below, based on FIG. 1 and referring to FIG. 2 and thereafter. Although the description of the invention to follow is with regard to a sketch of a vehicle 100, the method for generating three-dimensional shape data of the present invention may also be applied to various non-vehicular three-dimensional objects, such as electrical products, railroad equipment, airplanes and the like. In the description that follows, three-dimensional and two-dimensional are sometimes abbreviated as 3D and 2D.

The operation of an embodiment of the method for generating three-dimensional shape data of the present invention will be described first. The description of the method for generating three-dimensional shape data according to the present invention that follows will serve also as a description of a three-dimensional shape data generating apparatus according to the present invention and a three-dimensional shape data generating program according to the present invention.

An embodiment of the method for generating three-dimensional shape data according to the present invention has (1) a process that inputs basic specifications of a vehicle 100 (overall height, overall width, tire arrangement information), (2) a process that reads in by a scanner image data of a sketch, (3) a process that reads sketched image data into a computer to transform a sketched image to data, (4) a process that associates two axes/two points, three axes/one point/one distance, three points, or three points/two axes in the sketch with two axes/two points, three axes/one point/one distance, three points, or three points/two axes defined in the computer, respectively, to define the placement and observation position within the three-dimensional space of the sketch, (5) a process that, of the lines drawn in the sketch (sketch lines), maps cross-section lines (center, door, and the like) into a three-dimensional space, (6) a process that, of the lines drawn in the sketch, transforms lines other than the cross-section lines into a solid body in the three-dimensional space, (7) a process that, in the three-dimensional space, deforms a created shape while holding the projection and perspective fixed, so that there is no distortion when observing in three views, and (8) a process that creates surfaces using lines in the acquired three-dimensional space.

The various processes of the embodiment of the method for generating three-dimensional shape data may be implemented by cooperation between the CPU of a computer and a program stored in memory. The method for generating three-dimensional shape data of the present invention is therefore described below as being embodied in a computer. The program for generating three-dimensional shape data in the present invention may be stored in an arbitrary medium, such as a DVD-ROM, a DVD-R, a DVD-RW, a DVD-RAM, a CD-ROM, a CD-R, or a CD-RW or the like.

Figure 1:
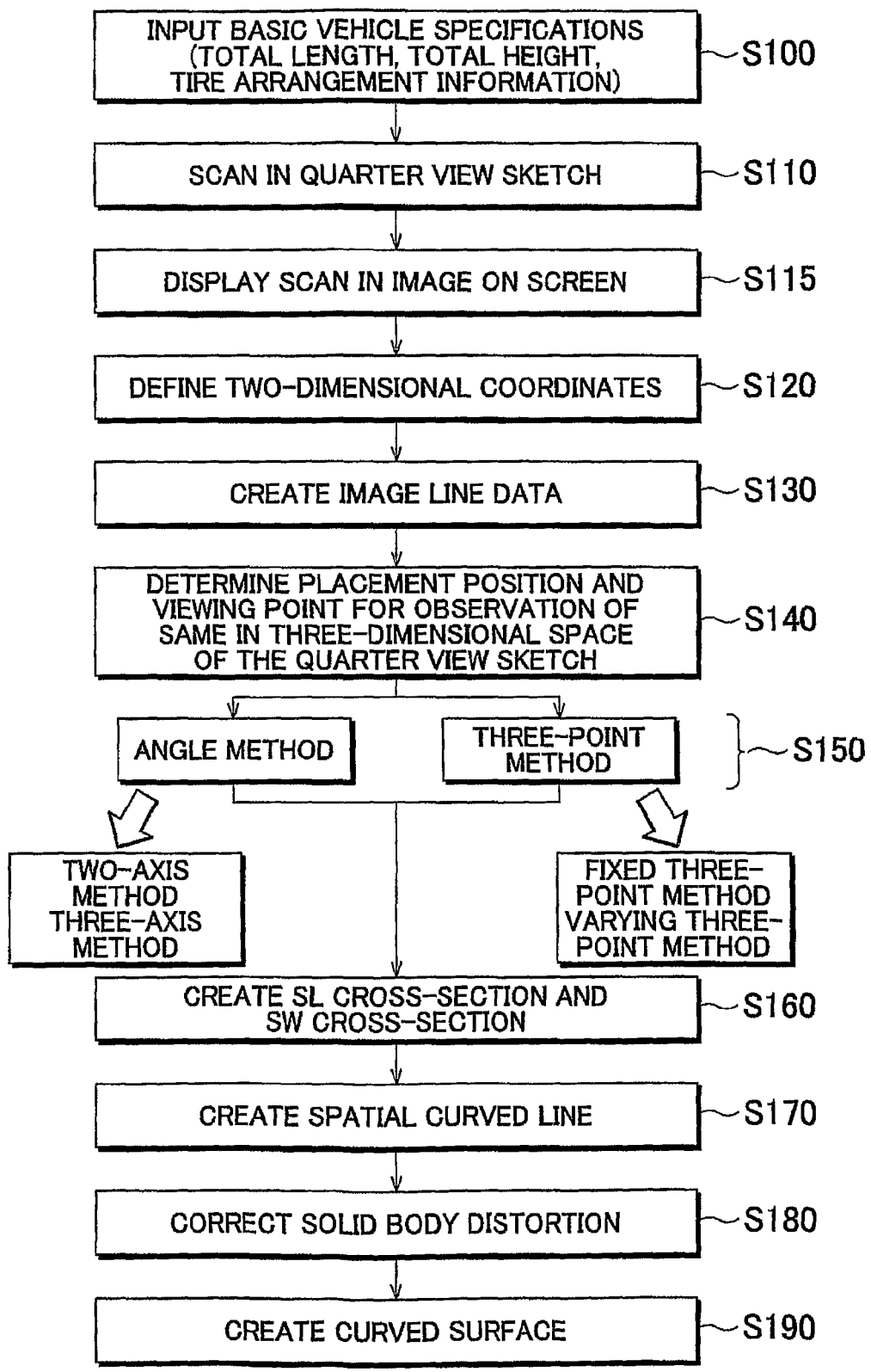
FIG. 1 is a flowchart of operation in an embodiment of a method for generating three-dimensional shape data according to the present invention.

FIG. 1 is a flowchart showing an embodiment of the method for generating three-dimensional shape data of the present invention, which generates three-dimensional shape data from a sketch. In the present invention, the term "sketch" shall be understood to refer to a drawing representing the intention and image of a designer, and this may have inaccurate representation of perspective, with different ratios and angles and may also have an inaccurate solid configuration as well.

Figure 2:
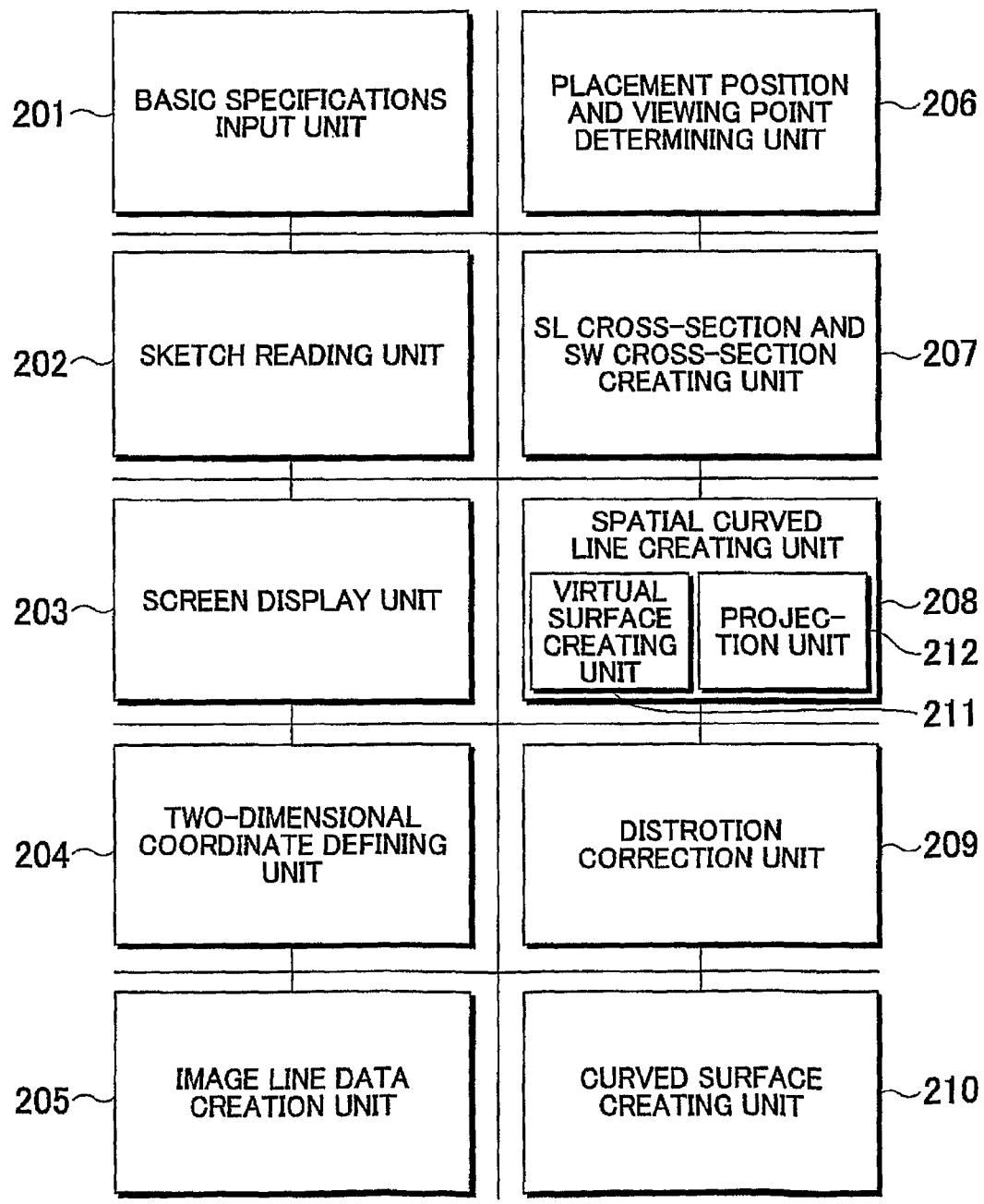
FIG. 2 is a functional block diagram of a computer that embodies the method for generating three-dimensional shape data according to the present invention.

FIG. 2 is a functional block diagram when embodying the method for generating three-dimensional shape data of the present invention using a computer. As shown in FIG. 2, when embodying the method for generating three-dimensional shape data of the present invention using a computer, the computer has a basic input device 201 formed, for example, by a keyboard or the like, for the purpose of inputting specifications such as the length of an object that is sketched, a sketch reading device 202 that reads in the image data of a sketch using a scanner or the like, and a screen display device 203 such as a display that displays an image of a sketch or the like that is read by the scanner.

Additionally, the computer has a two-dimensional coordinate defining unit 204 that defines the two-dimensional coordinates in an image displayed on the screen display device 203, an image line data generating device 205 that generates data from an image read in by the scanner, a placement position and viewing point determining unit 206 that determines the placement position in the three-dimensional space of an image read in by the scanner and the viewing point position of the image read in by the scanner, an SL cross-section and SW cross-section creating unit 207 that creates a door cross-sectional outer contour line (SL cross-sectional outer contour line) and a center cross-sectional outer contour line (SW cross-sectional outer contour line) in the three-dimensional space, a spatial curve creating unit 208 that creates a spatial curve from a created cross-sectional outer contour line, a distortion correction unit 209 that corrects distortion from the three directions of the side plane, front plane, and top plane, and a curved surface creating unit 210 that creates a curved surface based on a created curved line.

The spatial curve creating unit 208 minimally has a virtual surface creating unit 211 that creates a virtual surface and also rotates, parallel translates, or enlarges/reduces one of the door cross-sectional outer contour line (SL cross-sectional outer contour line) and the center cross-sectional outer contour line (SW cross-sectional outer contour line) to create a virtual curved surface, and a projection unit 212 that projects a line of the sketch from the viewing point onto the virtual curved surface so as to create a spatial curved line. A program stored in a memory may implement the functions of these units, shown in FIG. 2.

Figure 3:
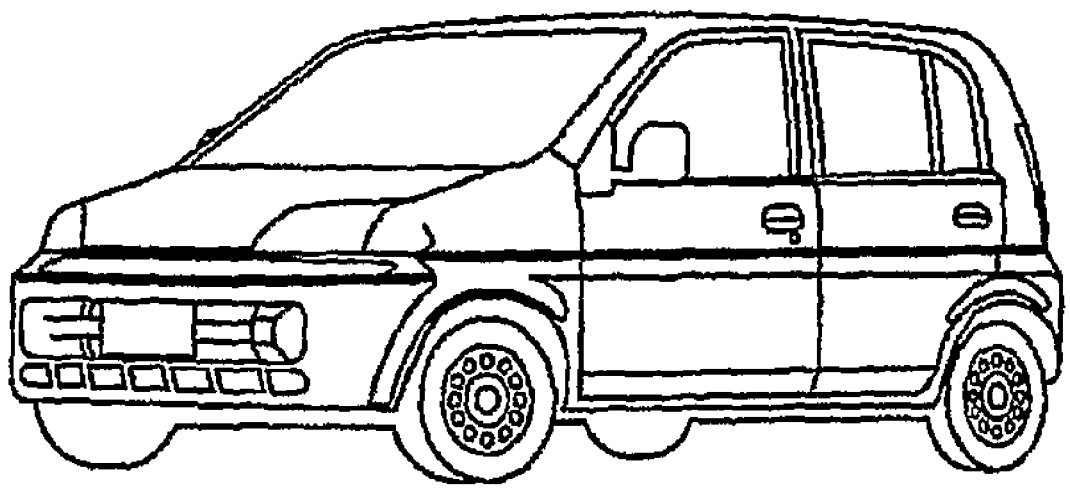
FIG. 3 is a simplified drawing of an example of a sketch used in the embodiment of a method for generating three-dimensional shape data according to the present invention.

First, input data that is input to the computer includes the given data of a three-dimensional object (in this embodiment, the overall length, the overall width, the height, and the tire arrangement information that includes the tire placement positions of a vehicle) (S100). The vehicle size is established by these data. In this embodiment, the sketch that is the basis for generating a three-dimensional shape data is a sketch (hereinafter referred to as a quarter view sketch) representing the vehicle as seen from a position at an angle from the left front (refer to FIG. 3). FIG. 3 is a simplified drawing of an example of a sketch used in this embodiment of the method for generating three-dimensional shape data of the present invention.

The image data of the quarter view sketch is read in by a scanner or the like (S110) and is displayed as an image on a display (S115). The image on the display corresponding to the sketch can be rotated, translated, enlarged or reduced by the user using, for example, a mouse.

Figure 4:
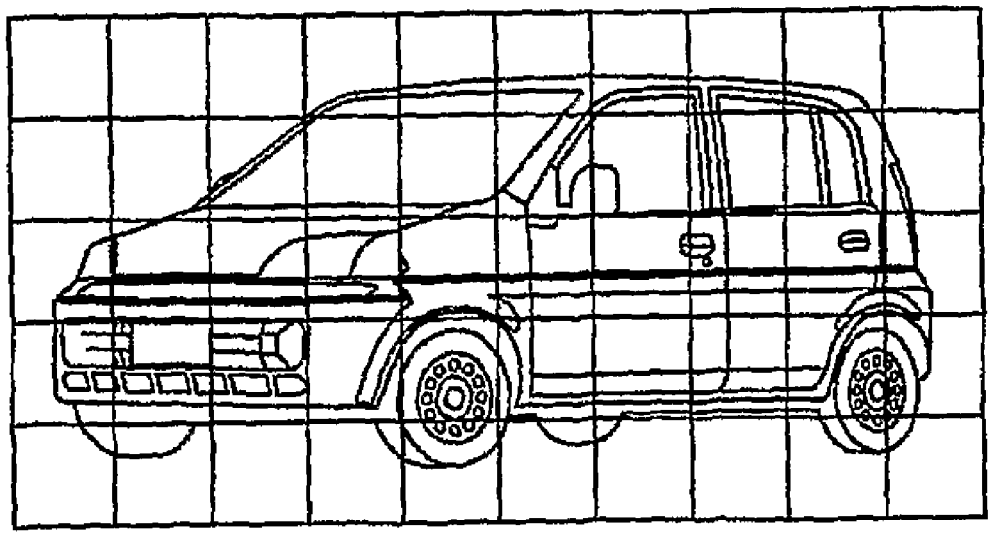
FIG. 4 is a simplified drawing of the defining of two-dimensional coordinates within the image of a sketch in the embodiment of a method for generating three-dimensional shape data according to the present invention.

Next, the user defines the two-dimensional coordinates in the image data of the sketch that has been scanned in (S120). That is, as shown in FIG. 4, with respect to the sketch that is read in by the scanner and input as data, the computer defines a two-dimensional coordinate system, based on prescribed parameters input by the user. FIG. 4 is a simplified drawing of the definition of the two-dimensional coordinate system in the image of the sketch in the embodiment of the method for generating three-dimensional shape data of the present invention.

Next, a line of the scanned sketch (image line) is converted to data (S130). That is, the image lines of the sketch are each represented as a set of coordinate values in the two-dimensional coordinate system. The image lines include character lines such as cross-section lines and contour lines. The image lines of the sketch are defined by data from these sets of coordinate values. The generation of data of the image lines of the sketch can be executed using a curve creating function that an existing CAD system usually has.

Next, the placement position of the image of the sketch, read in by the scanner, in the three-dimensional space and the vanishing point that will be the direction of observation thereof are determined (S140). The determining processing associates the points and vectors drawn in the sketch with points and vectors in three-dimensional space.

The determining processing is performed by either the angle method or the three-point method (S150). The angle method is the method of performing processing to determine the placement position of the image of the sketch in the three-dimensional space and the viewing point that will be the direction of observation of the image, based on the defined coordinate axes. The three-point method is the method of performing processing so as to define three points in the sketch and three points in the three-dimensional space, and determining the placement position of the image of the sketch and the viewing point that will be the observation direction of the image, based on those three points.

Figure 5:
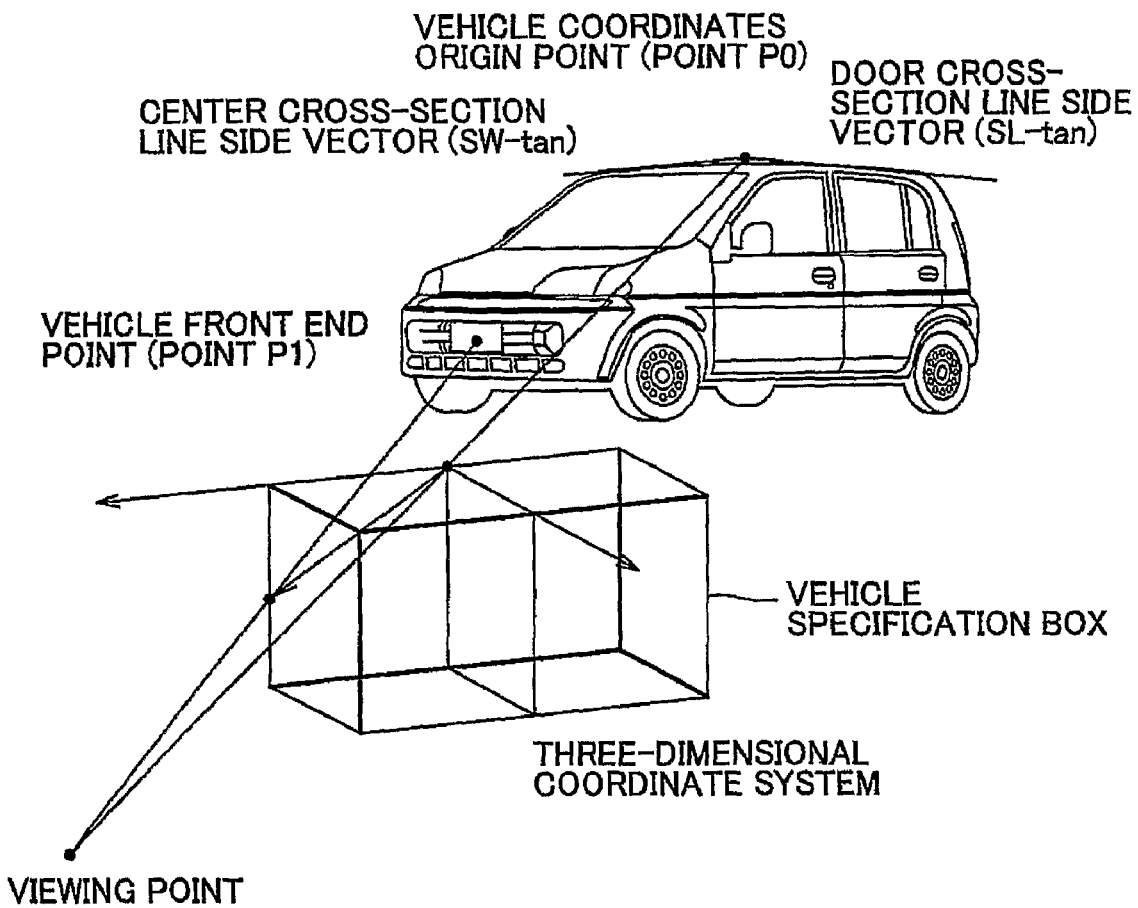
FIG. 5 is a simplified drawing of operation of the two-axis method in the embodiment of a method for generating three-dimensional shape data according to the present invention.
Figure 7:
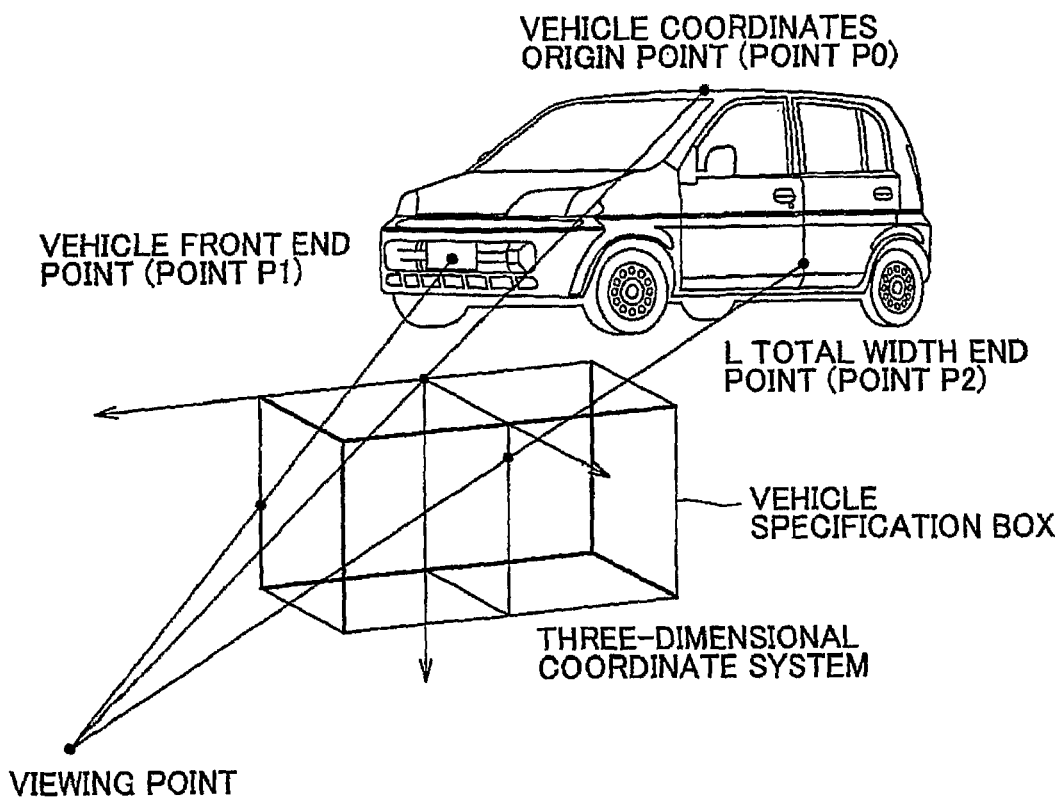
FIG. 7 is a simplified drawing of operation of the fixed three-point method in the embodiment of a method for generating three-dimensional shape data according to the present invention.
Figure 8:
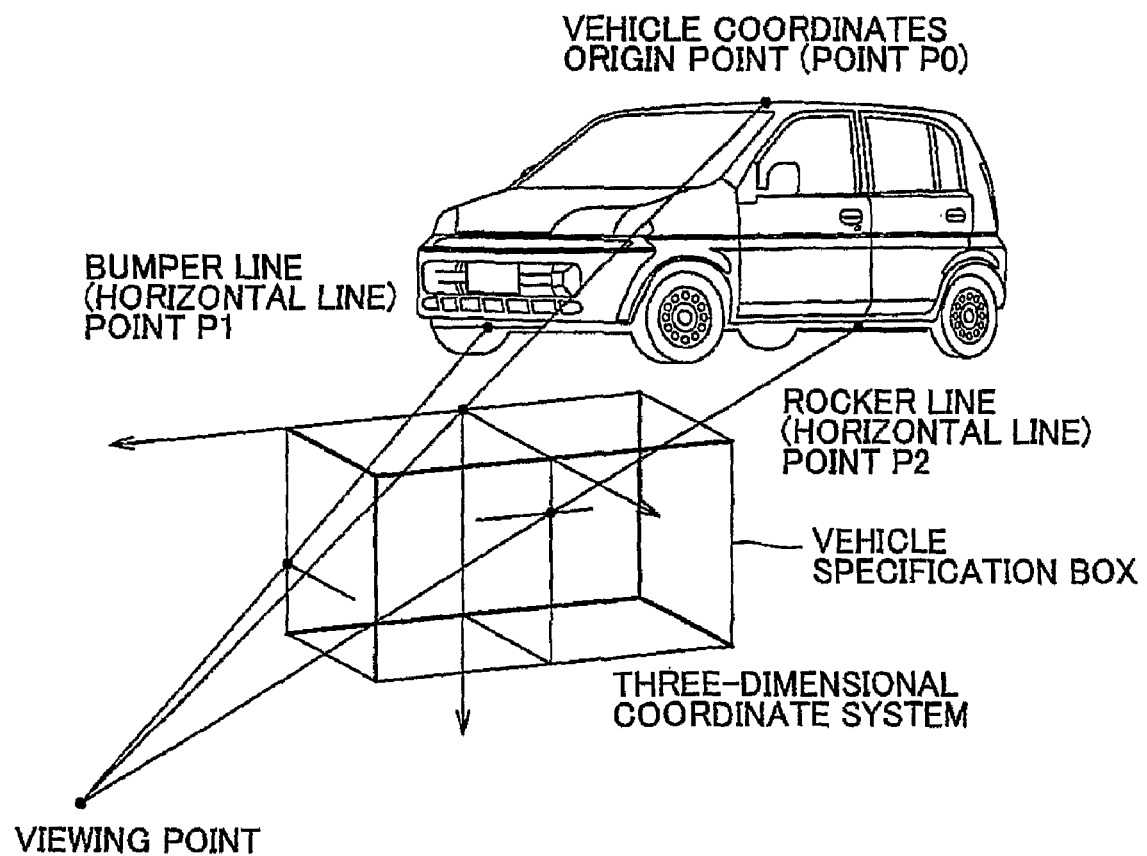
FIG. 8 is a simplified drawing of operation of the varying three-point method in the embodiment of a method for generating three-dimensional shape data according to the present invention.

The angle method includes a two-axis method (refer to FIG. 5) and a three-axis method (refer to FIG. 6). The three-point method includes a fixed three-point method (refer to FIG. 7) and a varying three-point method (refer to FIG. 8). These determining processing types will be described in sequence below. FIG. 5 is a simplified drawing of the two-axis method in the embodiment of a method for generating three-dimensional shape data according to the present invention, FIG. 6 is a simplified drawing of operation of the three-axis method in the embodiment of a method for generating three-dimensional shape data according to the present invention, FIG. 7 is a simplified drawing of operation of the fixed three-point method in the embodiment of a method for generating three-dimensional shape data according to the present invention, and FIG. 8 is a simplified drawing of operation of the varying three-point method in the embodiment of a method for generating three-dimensional shape data according to the present invention.

The two-axis method of the angle method is a process that associates two coordinate axes and two points in the sketch with two coordinate axes and two points in a three-dimensional space. Through this process an orthogonal space is established by two axes, an origin point established at one point, and a distance is established between two points.

Figure 9:
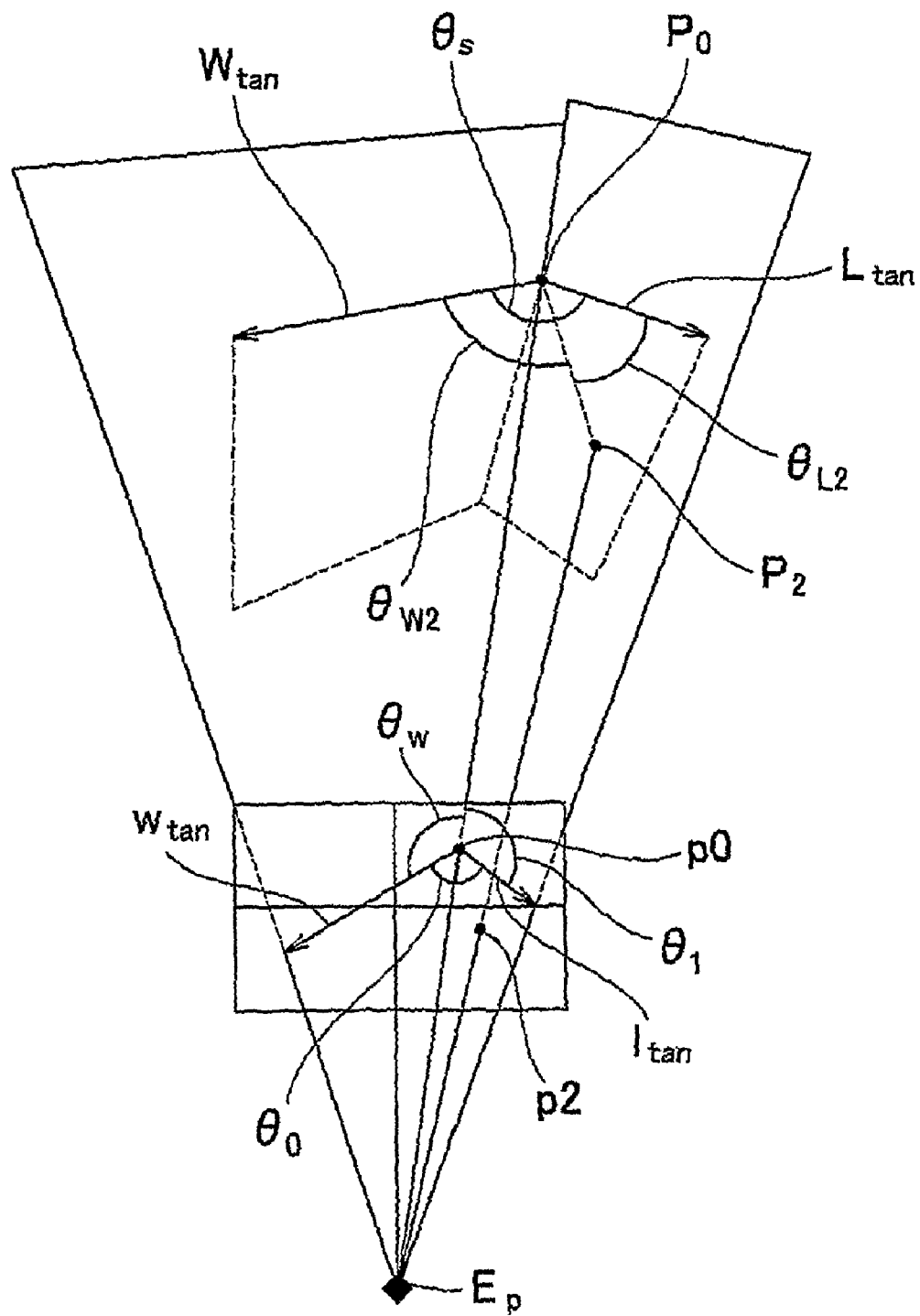
FIG. 9 shows the definitions of values in the algorithm of the two-axis method in the embodiment of a method for generating three-dimensional shape data according to the present invention.

The two-axis method is described below, with reference to FIG. 9, FIG. 10, and FIG. 11. FIG. 9 is a drawing that defines the values in the two-axis method algorithm, FIG. 10 is a table of names of variables used in the two-axis method algorithm, and FIG. 11 is a table of restraining conditions used in the two-axis method algorithm.

First, the directional vector W tan is expressed by the following equation (1) by the restraining condition (a) shown in FIG. 11.

$$\vec{V_w} = k_1 \vec{v_w} + k_2 \vec{v_e} \quad (1)$$

Because the vector is normalized, the following equation is derived.

$$|\vec{V_w}| = 1$$

From the above equations, equation (2) is derived.

$$1 = |\vec{V_W}|^2 = |k_1\vec{v_w} + k_2\vec{v_e}|^2$$

$$1 = k_1^2 + k_2^2 + 2k_1k_2 \cos \theta_w \quad (2)$$

If the vector direction is significant, the following condition (3) is added.

$$k_1 > 0 \quad (3)$$

From the restraining condition (b) shown in FIG. 11, L tan, similar to W tan, can be expressed by equations (4), (5), and (6).

$$\vec{V_L} = k_3\vec{v_l} + k_4\vec{v_e} \quad (4)$$

$$1 = k_3^2 + k_4^2 + 2k_3k_4 \cos \theta_l \quad (5)$$

$$k_3 > 0 \quad (6)$$

From the restraining condition (c) shown in FIG. 11, the following equation (7) is established.

$$P_0 = E_p + t \cdot \vec{v_e} \quad (7)$$

By the restraining condition (d) shown in FIG. 11, the following equation (8) is established.

$$P_2 = E_p + s \cdot \vec{v_2} \quad (8)$$

Because the angle formed by the vectors $$\vec{V_L}$$

and $$\vec{V_W}$$

is $$\theta_S$$

the following equation is established.

$$\vec{V_L} \cdot \vec{V_W} = \cos \theta_S$$

From the equations (1) and (4), the following equation (9) is derived.

$$k_1k_3 \cos \theta_{wl} + k_2k_3 \cos \theta_l + k_1k_4 \cos \theta_w + k_2k_4 = \cos \theta_S \quad (9)$$

Because of the known condition that the distance between $P_0$ and $P_1$ is d, the following equation is established.

$$|\overrightarrow{P_0P_2}| = d$$

From the equations (7) and (8), the following equation (10) is derived.

$$s^2 + t^2 - 2st \cos \theta_{e2} = d^2 \quad (10)$$

In the above, the following condition (11) is added.

$$d \neq 0 \quad (11)$$

If we consider that p0 and p2 on the QV screen are closer to the viewing point Ep than 3D P0 and P2, the following restraining condition (12) can be added.

$$\begin{cases} s > 0 \\ t > 0 \end{cases} \quad (12)$$

Because of the known condition that the angle formed by L tan and $$\overrightarrow{P_0P_2}$$

is $$\theta_{L2}$$

the following equation is established.

$$\vec{V_L} \cdot \frac{\overrightarrow{P_0P_2}}{d} = \cos\theta_{L2}$$

From the equations (4), (7), and (8) we have the following equation (13).

$$k_3s \cos \theta_{l2} + k_4s \cos \theta_{e2} - k_3t \cos \theta_l - k_4t = d \cdot \cos \theta_{L2} \quad (13)$$

From the known conditions that the angle formed by W tan and $$\overrightarrow{P_0P_2}$$

is $$\theta_{W2}$$

the following equation is established.

$$\vec{V_W} \cdot \frac{\overrightarrow{P_0P_2}}{d} = \cos\theta_{W2}$$

From the equations (1), (7), and (8) we have the following equation (14).

$$k_1s \cos \theta_{w2} + k_2s \cos \theta_{e2} - k_1t \cos \theta_w - k_2t = d \cdot \cos \theta_{w2} \quad (14)$$

From the above, with respect to the six variables s, t, $k_1$, $k_2$, $k_3$, and $k_4$, the six equations (2), (5), (9), (10), (13), and (14) are established. It is therefore possible to solve for the six variables. By doing this, it is possible to identify the relative positions of the viewing point and the points P0 and P1. Additionally, it is possible to calculate the transformation matrix A used to perform transformation from 3D to QV (quarter view sketch).

The three-axis method of the angle method is described next. The three-axis method (FIG. 6) of the angle method associates three coordinate axes, one point, and one distance of an axis in the sketch with three coordinate axes, one point, and one distance of an axis in the three-dimensional space. By this determining method, an orthogonal space is established by three axes, an origin point is established by one point, and a distance is established by one plane (one axis distance).

The three-axis method is described below, with references made to FIG. 12, FIG. 13, and FIG. 14. FIG. 12 is a simplified drawing showing the three axes and the one point defined in the sketch in the three-axis method in the embodiment of a method for generating three-dimensional shape data according to the present invention, FIG. 13 is a table showing the input items and output items in the three-axis method in the embodiment of a method for generating three-dimensional shape data according to the present invention, and FIG. 14 is a simplified drawing of the three-axis method in the embodiment of a method for generation three-dimensional shape data according to the present invention.

Figures 13, 14:
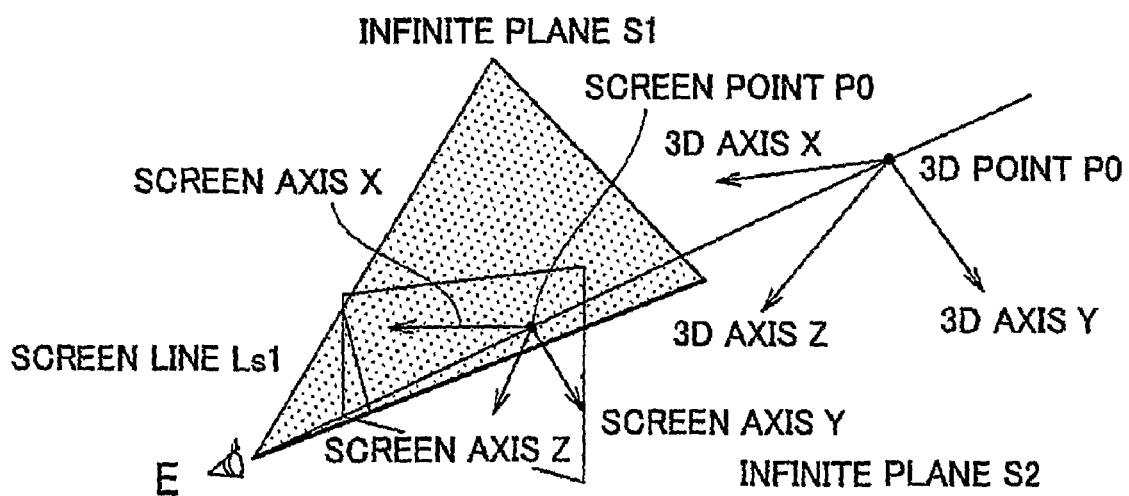
FIG. 13 is a table showing the input items and output items in the three-axis method in the embodiment of a method for generating three-dimensional shape data according to the present invention.
FIG. 14 is a conceptual drawing of the three-axis method in the embodiment of a method for generation three-dimensional shape data according to the present invention.

In the example shown in FIG. 13, the screen point P0, the three orthogonal screen axes, the screen line 1, the 3D point P0, the three 3D orthogonal axes, the 3D point P1, and the viewing angle are input items, and the 3D-QV transformation matrix is an output item. In FIG. 13, the screen point P0, the three orthogonal screen axes, and the screen line 1 are the points, axes, and lines of the sketch read in by a scanner, and the 3D point P0, the three 3D orthogonal axes, and the 3D point P1 are points, axes, and lines defined in a computer.

The input conditions for the three-axis method are that the point P0, the axis X, the axis Y, and the axis Z indicated on the screen (within the sketched image) each overlap with 3D items (within the three-dimensional space), and that the line Ls1 (FIG. 13) indicated on the screen is overlapped by the 3D point PI. These input conditions are conditions that must be satisfied when a user inputs points or lines on the screen.

The algorithm of the three-axis method will now be described, with reference made to FIG. 14. First, let a vector passing through the point P0 on the screen from the viewing point E be $$\vec{v_{E0}}$$

Also, let an infinite plane defined by the viewing point E and the screen axis X be Sx, and let the directional vector of the screen axis X be $$\vec{v_{SX}}$$

When this is done, the directional vector of the normal line Nx to the infinite plane Sx, which is $$\vec{v_{NX}}$$

is determined by the following equation.

$$\vec{v_{NX}} = \vec{v_{SX}} \times \vec{v_{E0}}$$

On the infinite plane Sx, a directional vector $$\vec{v_{E0}}$$

that is perpendicular to the vector $$\vec{v_{0X}}$$

is determined by the following equation.

$$\vec{v_{0X}} = \vec{v_{E0}} \times \vec{v_{NX}}$$

Rotation is done as appropriate so as to face the same direction as the screen axis X as seen from the viewing point E. When this is done, the 3D axis X directional vector $$\vec{v_X}$$

is expressed as follows.

$$\vec{v_X} = \vec{v_{0X}} \cos\theta_X + \vec{v_{E0}} \sin\theta_X$$

If the straight line direction is to be significant, $$-\frac{\pi}{2} < \theta_X < \frac{\pi}{2}$$

In the same manner as the infinite plane $S_x$, the directional vector of the normal line $N_Y$ to the infinite plane $S_Y$ defined by the viewing point E and the screen axis Y $$\vec{v_{NY}}$$

and the directional vector of the normal line $N_Y$ to the infinite plane $S_Y$ defined by the viewing point E and the screen axis Y $$\vec{v_{NZ}}$$

are determined. When this is done, because the 3D axes X, Y, and Z are mutually orthogonal, the directional vector of the 3D axis Y, $$\vec{v_Y}$$

is $$\vec{v_Y} = \vec{v_X} \times \vec{v_{NY}} = [\vec{v_{0X}} \times \vec{v_{NY}}] \cos\theta_X + [\vec{v_{E0}} \times \vec{v_{NY}}] \sin\theta_X$$

and, in the same manner, the directional vector of the 3D axis Z $$\vec{v_Z}$$

is $$\vec{v_Z} = \vec{v_X} \times \vec{v_{NZ}} = [\vec{v_{0X}} \times \vec{v_{NZ}}] \cos\theta_X + [\vec{v_{E0}} \times \vec{v_{NZ}}] \sin\theta_X$$

Additionally, from $$\vec{v_Y} \cdot \vec{v_Z} = 0$$

the following equation is established.

$$0 = k_1 \sin^2\theta_X + k_2 \sin\theta_X \cos\theta_X + k_3 \cos^2\theta_X$$

In the above, $$k_1 = (\vec{v_{E0}} \times \vec{v_{NY}}) \cdot (\vec{v_{E0}} \times \vec{v_{NZ}})$$
$$k_2 = (\vec{v_{E0}} \times \vec{v_{NZ}}) \cdot (\vec{v_{0X}} \times \vec{v_{NY}}) + (\vec{v_{E0}} \times \vec{v_{NY}}) \cdot (\vec{v_{0X}} \times \vec{v_{NZ}})$$
$$k_3 = (\vec{v_{0X}} \times \vec{v_{NY}}) \cdot (\vec{v_{0X}} \times \vec{v_{NZ}})$$

From the condition that the 3D axis X does not overlap with the vector $$\vec{v_{E0}}$$

and is $$\cos\theta_X \neq 0$$

if both sides are divided by $$\cos^2\theta_X$$

we have $$0 = k_1 \tan^2\theta_X + k_2 \tan\theta_X + k_3$$

If this is solved, from the condition $$-\frac{\pi}{2} < \theta_X < \frac{\pi}{2}$$

and the signs of the axis Y and axis Z directions, $$\theta_X$$

is determined.

For a given rotation matrix R (3, 3), if the directional vectors before and after rotation of two non-parallel vectors are known, the rotation matrix is uniquely established. If the directional vector after rotation is $$\vec{v_1}, \vec{v_2}, \vec{v_3}$$

and the directional vector before rotation is $$\vec{V_1}, \vec{V_2}, \vec{V_3}$$

the rotation matrix R is $$R = \begin{pmatrix} v_{1x} & v_{2x} & v_{3x} \\ v_{1y} & v_{2y} & v_{3y} \\ v_{1z} & v_{2z} & v_{3z} \end{pmatrix} \begin{pmatrix} V_{1x} & V_{1y} & V_{1z} \\ V_{2x} & V_{2y} & V_{2z} \\ V_{3x} & V_{3y} & V_{3z} \end{pmatrix}$$

$$\left( \text{WHERE } \vec{v_3} = \vec{v_1} \times \vec{v_2}, \vec{V_3} = \vec{V_1} \times \vec{V_2} \right)$$

Using this the rotation matrix R is determined. Next, the infinite plane $S_1$ is an infinite plane defined by the viewing point E and the straight line Ls1 on the screen. Let the directional vector of the normal line $N_1$ to the infinite plane $S_1$ be $$\vec{v_{N1}}$$

If the 3D point P0 is at the position $$P_0 = E + k\vec{v_{E0}}$$

from $$\overrightarrow{P_0 P_1} = -k \cdot \frac{\vec{v_{E0}} \cdot \vec{v_{N1}}}{\vec{v_{N1}} \cdot \vec{v_{01}}}$$

the distance k between the viewing point and point P0 and the scale (relative distance between coordinate systems) are determined from $$k = -\overrightarrow{P_0 P_1} \cdot \frac{\vec{v_{N1}} \cdot \vec{v_{01}}}{\vec{v_{E0}} \cdot \vec{v_{N1}}}$$

The fixed three-point method of the three-point method is described next. The fixed three-point method (FIG. 7) establishes correspondence between three points within the sketch and three points within the three-dimensional space. The three points within the sketch are fixed at the vehicle coordinates origin point P0, the vehicle front end point (point P1), and the total width end point (P2). This process establishes the viewing point position and the coordinates in the three-dimensional space with respect to a sketch read in by a scanner.

The algorithm of the fixed three-point method is described below. In general, the correspondence between a point in the two-dimensional coordinate system and a point in the three-dimensional coordinate system is expressed by the following projection matrix.

$$\begin{bmatrix} a_{00} & a_{01} & a_{02} & a_{03} \\ a_{10} & a_{11} & a_{12} & a_{13} \\ a_{20} & a_{21} & a_{22} & 1 \end{bmatrix}$$

If the two-dimensional coordinates are (u, v) and the three-dimensional coordinates are (x, y, z), the correspondence relationship between the two-dimensional and three-dimensional coordinates is expressed as follows, where s is a constant.

$$s \begin{bmatrix} u \\ v \\ 1 \end{bmatrix} = \begin{bmatrix} a_{00} & a_{01} & a_{02} & a_{03} \\ a_{10} & a_{11} & a_{12} & a_{13} \\ a_{20} & a_{21} & a_{22} & 1 \end{bmatrix} \begin{bmatrix} x \\ y \\ z \\ 1 \end{bmatrix} \quad (a)$$

If the above equation is re-arranged, we have the following.

$$xa_{00} + ya_{01} + za_{02} + a_{03} = u(xa_{20} + ya_{21} + za_{22} + 1)$$

$$xa_{10} + ya_{11} + za_{12} + a_{13} = v(xa_{20} + ya_{21} + za_{22} + 1)$$

In the above, there are 11 unknowns. That is, the projection matrix is established if there are at least six points of correspondence between a point in the two-dimensional coordinates and a point in the three-dimensional coordinates, and it is possible to establish correspondence between a point in two-dimensional coordinates and a point in three-dimensional coordinates. Also, the equation (a) can be re-arranged as follows.

$$s \begin{bmatrix} u \\ v \\ 1 \end{bmatrix} = \begin{bmatrix} a_{00} & a_{01} & a_{02} & a_{03} \\ a_{10} & a_{11} & a_{12} & a_{13} \\ a_{20} & a_{21} & a_{22} & 1 \end{bmatrix} \begin{bmatrix} x \\ y \\ z \\ 1 \end{bmatrix} = \begin{bmatrix} f & 0 & 0 \\ 0 & f & 0 \\ 0 & 0 & 1 \end{bmatrix} \begin{bmatrix} & & & t_x \\ & R & & t_y \\ & & & t_z \end{bmatrix} \begin{bmatrix} x \\ y \\ z \\ 1 \end{bmatrix}$$

In the above, f is the focal distance, R is a rotation matrix including the direction angle and elevation angle, and tx, ty, and tz are parallel translation matrices. If the focal distance is determined, there are the five unknowns of the rotation matrix and the parallel translation matrices, and if there are at least three points of correspondence between a point in two-dimensional coordinates and a point in three-dimensional coordinates, the projection matrix is established, and it is possible to establish correspondence between a point in two-dimensional coordinates and a point in three-dimensional coordinates. Methods of setting the perspective that emphasizes the center cross-section include not only the above three-point example, but also various other methods.

The varying three-point method of the three-point method is described next. The varying three-point method (FIG. 8) establishes correspondence between three points within the sketch and three points within the three-dimensional space. The three points within the sketch are the vehicle coordinates origin point P0, a point on the bumper line (point P1), and a point on the rocker line (horizontal line) (point P2). This process establishes the viewing point position and the coordinates in the three-dimensional space with respect to a sketch read in by a scanner.

Figures 15, 16:
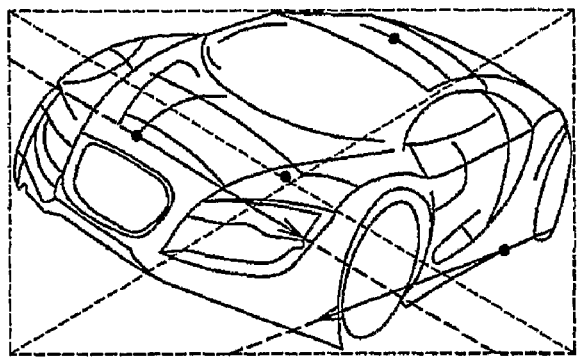
FIG. 15 is a conceptual drawing showing the three points defined in the sketch in the varying three-point method in the embodiment of a method for generating three-dimensional shape data according to the present invention.
FIG. 16 is a table showing the input items and output items in the varying three-point method in the embodiment of a method for generating three-dimensional shape data according to the present invention.
Figure 17:
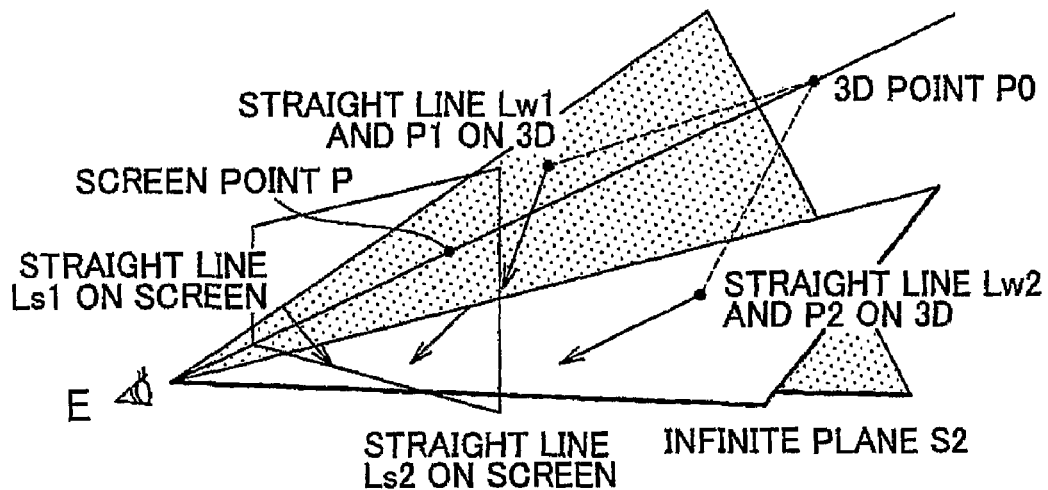
FIG. 17 is a conceptual drawing of the varying three-point method in the embodiment of a method for generating three-dimensional shape data according to the present invention.

The varying three-point method will now be described, with references made to FIG. 15, FIG. 16, and FIG. 17. FIG. 15 is a conceptual drawing showing the three points defined in the sketch in the varying three-point method in the embodiment of a method for generating three-dimensional shape data according to the present invention, FIG. 16 is a table showing the input items and output items in the varying three-point method in the embodiment of a method for generating three-dimensional shape data according to the present invention, and FIG. 17 is a conceptual drawing showing the varying three-point method in the embodiment of a method for generating three-dimensional shape data according to the present invention.

The algorithm of the varying three-point method is described below. The infinite plane S1 is an infinite plane established by the viewing point E and the straight line Ls1 on the screen. The infinite plane S2 is similar. If we let the directional vector of the straight line Ls1 on the screen be $$\vec{v_{11}}$$

on the infinite plane S1, let the directional vector $$\vec{v_{11}}$$

be orthogonal to $$\vec{v_{12}}$$

Let the directional vector of the normal line N1 to the infinite plane S1 be as follows.

$$\vec{v_{N1}}$$

Given this, the directional vector $$\vec{v_1}$$

of the straight line 3D Lw1 is expressed as follows.

$$\vec{v_1} = \vec{v_{11}} \cos\theta_1 + \vec{v_{12}} \sin\theta_1$$

Because the direction when the directional vector $$\vec{v_1}$$

of the 3D straight line Lw1 is projected onto the screen is determined by the location of the starting and ending points of the directional vector $$\vec{v_1}$$

it is not possible to restrict the angle. Thus, we have.

$$-\pi < \theta_1 < \pi$$

The infinite plane S2 is established by the starting point E and the straight line Ls2 on the screen. The normal line N2 to this infinite plane is established at the same time. Let the directional vector of N2 be as follows.

$$\vec{v_{N2}}$$

Under this condition, because the directional vector $$\vec{v_2}$$

of the 3D straight line Lw2 is on the infinite plane S2, the following equation is established.

$$\vec{v_2} = \vec{v_1} \times \vec{v_{N2}}$$

Because the direction when the directional vector $$\vec{v_2}$$

of the 3D straight line Lw2 is projected onto the screen is determined by the location of the starting and ending points of the directional vector $$\vec{v_2}$$

it is not possible to restrict the angle. Thus, the rotation matrix is determined by the following method, and the determination is made by whether or not the vector directed from P0 to P1 and the vector directed from P0 to P2 intersect with the infinite plane S1 and the infinite plane S2 from the point P0. For a given rotation matrix R (3, 3), if the directional vectors before and after rotation of two non-parallel vectors are known, the rotation matrix is uniquely established. If the directional vector after rotation is $$\vec{v_1}, \vec{v_2}, \vec{v_3}$$

and the directional vector before rotation is $$\vec{V_1}, \vec{V_2}, \vec{V_3}$$

the rotation matrix R is $$R = \begin{pmatrix} v_{1x} & v_{2x} & v_{3x} \\ v_{1y} & v_{2y} & v_{3y} \\ v_{1z} & v_{2z} & v_{3z} \end{pmatrix} \begin{pmatrix} V_{1x} & V_{1y} & V_{1z} \\ V_{2x} & V_{2y} & V_{2z} \\ V_{3x} & V_{3y} & V_{3z} \end{pmatrix}$$

$$\left(\text{WHERE } \vec{v_3} = \vec{v_1} \times \vec{v_2}, \vec{V_3} = \vec{V_1} \times \vec{V_2}\right)$$

Because this includes the variable $$\theta_1$$

using a ratio of the distance from the 3D points P0 to P1 to the distance from the 3D points P0 to P2, the variable.

$$\theta_1$$

and the rotation matrix R are uniquely established. If the directional vector from the 3D points P0 to P1 is $$\vec{v_{01}}$$

the directional vector from the 3D points P0 to P2 is $$\vec{v_{02}}$$

and the directional vector passing from the starting point E to the point P0 on the screen is $$\vec{v_{E0}}$$

the following equation is then established.

$$\frac{\overline{P_0 P_1}}{\overline{P_0 P_2}} = \frac{\vec{v_{E0}} \cdot \vec{v_{N1}} / \vec{v_{N1}} \cdot \vec{v_{01}}}{\vec{v_{E0}} \cdot \vec{v_{N2}} / \vec{v_{N2}} \cdot \vec{v_{02}}}$$

However, the direction of $$\vec{v_{N1}}, \vec{v_{N2}}$$

is reversed so that $$\vec{v_{E0}} \cdot \vec{v_{N1}} > 0, \vec{v_{E0}} \cdot \vec{v_{N2}} > 0$$

Also, $$\vec{v_{N1}} \cdot \vec{v_{01}} > 0, \vec{v_{N2}} \cdot \vec{v_{02}} > 0$$

is not possible.

If the 3D point P0 is positioned at $$P_0 = E + k \vec{v_{E0}}$$

from $$\overline{P_0 P_1} = k \cdot \frac{\vec{v_{E0}} \cdot \vec{v_{N1}}}{\vec{v_{N1}} \cdot \vec{v_{01}}}$$

we have $$k = \overline{P_0 P_1} \cdot \frac{\vec{v_{N1}} \cdot \vec{v_{01}}}{\vec{v_{E0}} \cdot \vec{v_{N1}}}$$

from which the distance between starting point and P0 and the scale (relative distance between coordinate systems) are determined. The above is a description of the various algorithms.

Figure 18:
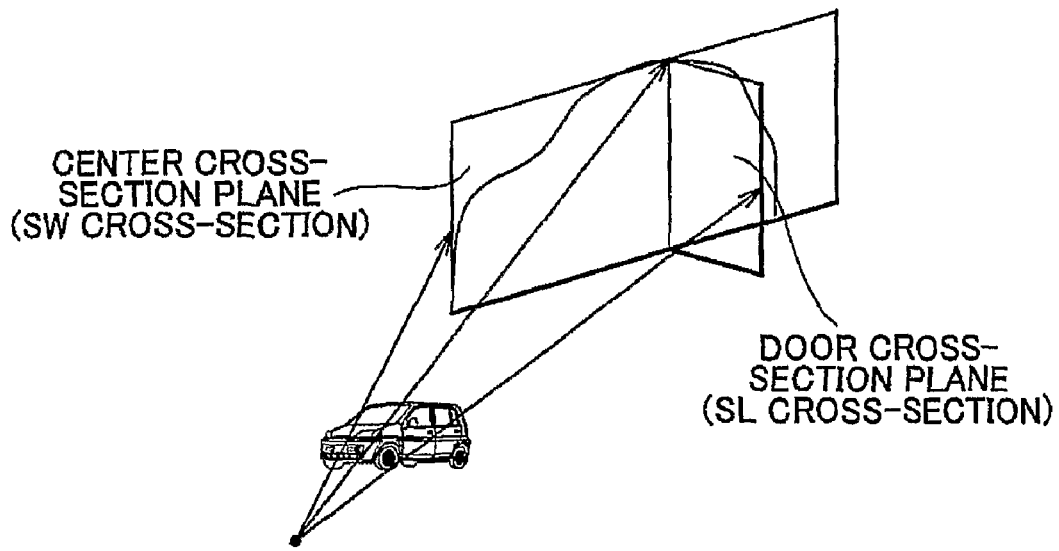
FIG. 18 is a simplified drawing of the operation of creating an SL cross-sectional outer contour line and an SW cross-sectional outer contour line in the embodiment of a method for generating three-dimensional shape data according to the present invention.

Next, as shown in FIG. 18, the SL cross-sectional outer contour line (center cross-sectional outer contour line) and SW cross-sectional outer contour line (door cross-sectional outer contour line) are created in the three-dimensional space (S160). FIG. 18 is a simplified drawing of the operation of creating an SL cross-sectional outer contour line and an SW cross-sectional outer contour line in the embodiment of a method for generating three-dimensional shape data according to the present invention.

Specifically, because an orthogonal coordinate system corresponding to the orthogonal coordinates in the sketch is created within the three-dimensional space in the computer, the center cross-section line and the door cross-section line are established in the three-dimensional space. The center cross-section line (SW cross-section line) and the door cross-section line (SL cross-section line) in the sketch are projected from the viewing point direction onto each of the respective cross-section planes in the three-dimensional space to generate cross-sectional outer contour lines within the three-dimensional space. In this case, the center cross-section is a plane that includes the center line of a three-dimensional object that is the target of the three-dimensional shape data generation, and in this embodiment this is a plane that includes the center line of vehicle extending in the longitudinal direction. The door cross-section is a plane that includes the outer contour line of the vehicle, as seen from the longitudinal direction of the vehicle, that is, a plane perpendicular to the center axis in the longitudinal direction of the vehicle or extending in the longitudinal direction of the vehicle.

Figure 19:
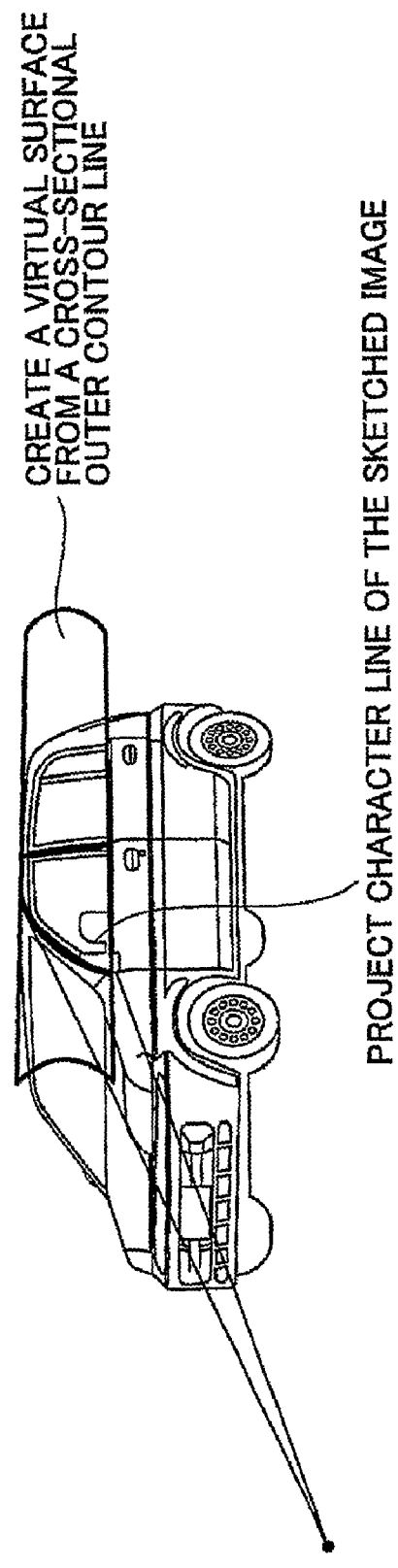
FIG. 19 is a simplified drawing of the operation of creating a spatial curved line in the embodiment of a method for generating three-dimensional shape data according to the present invention.

Next, as shown in FIG. 19, a spatial curved line is created (S170). FIG. 19 is a conceptual drawing of the operation of creating a spatial curved line in the embodiment of a method for generating three-dimensional shape data according to the present invention. Specifically, a cross-sectional outer contour line generated in the three-dimensional space creates a swept surface by rotating, parallel-translating, or expanding or reducing the SW cross-sectional outer contour line in the direction of the SL cross-section, and by rotating, parallel-translating, or expanding or reducing the SL cross-sectional outer contour line in the direction of the SW cross-section, and a character line showing the shape of the vehicle in the sketch is then projected onto the swept surface from the viewing point, thereby generating a spatial curved line.

Next, as shown in FIG. 20, correction of solid body distortion is executed (S180). FIG. 20 is a simplified drawing of the operation of correcting solid body distortion according to the method for generating three-dimensional shape of the present invention. The correction of solid body distortion corrects the shape, which might appear to have proper perspective, but is actually distorted or appears unnatural when viewed in three dimensions. The correction of solid body distortion is divided into perspective fixing correction and overall shape changing.

Perspective fixing correction corrects the components that establish the perspective direction (coordinate values, tangent lines, and curvature components). That is, if the line end point is moved on the line L1 and the tangent line end is moved on the line L2, correction of shape may be performed while the perspective is being fixed.

Overall shape changing corrects the inclination of the solid body in each projection without changing the appearance of the solid body for other projections. That is, as shown in image 2001, the distortion of a line, which is distorted when viewed from above the vehicle, is removed as shown in image 2002, without changing its appearance when viewed from the side of the vehicle. Similarly, the distortion of a rotation line, which is distorted or does not accord with a target line when viewed from above the vehicle as shown in image 2003, is distorted to the target line as shown in image 2004.

At the next step S190, various curved surfaces of a three-dimensional object are created from the curved line data expressed in three-dimensional coordinates obtained from the above-described steps, using an existing CAD function. As a result the three-dimensional shape data of a three-dimensional object may be acquired from a sketch drawn by a designer.

A viewing point in a three-dimensional space may be determined from a single sheet of sketch in this manner, and sweeping the SL cross-sectional outer contour line and the SW cross-sectional outer contour line to generate spatial curved lines and then create curved surfaces, a single sketch is sufficient according to the method for generating three-dimensional shape data of the present invention.

A method for generating three-dimensional shape data according to the present invention also creates a three-dimensional body that conforms to the intent and image of a designer who drew the sketch. Additionally, according to an embodiment of a method for generation three-dimensional shape data of the present invention, because a three-dimensional space is defined by vehicle specifications such as the total length, total width, and the like it is possible to create a three-dimensional body conforming to the specifications. Since, to conform to the specifications, a solid body may have distortion depending on the viewing direction, it is possible, by studying specifications that does not cause distortion, to propose specifications that implement an attractive design evaluating a sketch.

In an embodiment of a method for generating three-dimensional shape data according to the present invention, because it is possible to create a three-dimensional image from a two-dimensional image even if a two-dimensional object created, for example, by computer graphics, it is possible, for example, to naturally synthesize a photographed background with a manmade two-dimensional object. Also, in an embodiment of a method for generating three-dimensional shape data according to the present invention, it is possible to easily transform an animation character to three-dimensional form.

In an embodiment of a method for generating three-dimensional shape data according to the present invention, although the example given was that of application to a sketch made by a designer, the method also makes it possible to create a three-dimensional animation character. This makes it easy to create animation with a change of the behavior of an animation character that has been transformed to 3D and then transform the animation character that has the change of the behavior to 2D form. This animated character may also be a vehicle or other conveyance, a living body, or a machine or the like. Additionally, because an embodiment of a method for generating three-dimensional shape data according to the present invention easily positions the viewing point of a photo image for which photographing condition is unknown, it can easily synthesize computer graphics with actual photographs.

An embodiment of a method for generating three-dimensional shape data according to the present invention may be applied to the generation of solid bodies by automotive manufacturers, consumer electronics manufacturers, and other manufactures that generate solid bodies from sketches, and can also be applied to the task of generating a solid body from a sketch in commercial film production, TV production, and movie production industries, as well as to the task of generating a solid body from sketches for animation production.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A method for generating three-dimensional shape data comprising:
   inputting a specification for a sketched image;
   reading in the sketched image as image data;
   creating data in two-dimensional coordinates from lines included in the read-in image;
   mutually associating a prescribed value set in the sketched image and a prescribed value in a three-dimensional space defined in a computer, and determining a placement position, in the three-dimensional space, of the sketched image and a viewing point position with respect to the image, so that the input specification is satisfied;
   mapping a cross-sectional line of the sketched image into the three-dimensional space and
   creating a cross-sectional outer contour line in the three-dimensional space, based on the placement position and the viewing point position;
   creating a first line, included in the sketched image from which data is created, as a spatial curved line in the three-dimensional space, using the cross-sectional outer contour line in the three-dimensional space;
   correcting distortion of the created spatial curved line; and
   creating a curved surface based on the corrected spatial curved line,
   wherein the creation of the spatial curved-line in three-dimensional space further comprises:
   creating a virtual surface by moving the cross-sectional outer contour line towards the cross-sectional line, and
   creating the spatial curved line by projecting a second line included in the sketched image onto the virtual surface from the viewing point direction.

2. The method for generating three-dimensional shape data according to claim 1, wherein the mutually associating and determining step is executed using one of:
   an angle method, whereby coordinate axes set in each of the sketched image and the three-dimensional space are mutually associated; or
   a three-point method, whereby three points set in each of the sketched image and the three-dimensional space are mutually associated.

3. The method for generating three-dimensional shape data according to claim 2, wherein the angle method is a two-axis method or a three-axis method.

4. The method for generating three-dimensional shape data according to claim 2, wherein the three-point method is a fixed three-point method or a varying three-point method.

5. The method for generating three-dimensional shape data according to claim 1, wherein the sketched image is a quarter view sketch.

6. The method for generating three-dimensional shape data according to claim 1, wherein the creation of data in two-dimensional coordinates further comprises:
   displaying the read-in image data on a screen, and
   defining two-dimensional coordinates in the read-in image data.

7. The method for generating three-dimensional shape data according to claim 1, wherein the sketched image is only one sheet.

8. The method for generating three-dimensional shape data according to claim 1, wherein the cross-sectional outer contour line in the three-dimensional space includes a first cross-sectional outer contour line including a central axis in the three-dimensional space of the sketched image, and a second cross-sectional outer contour line that orthogonally crosses the central axis in the three-dimensional space of the sketched image.

9. The method for generating three-dimensional shape data according to claim 1, wherein the sketched image depicts a vehicle.

10. The method for generating three-dimensional shape data according to claim 9, wherein the specification comprises basic specifications of the vehicle.

11. An apparatus for generating three-dimensional shape data comprising:
    an inputting unit that inputs a specification for a sketched image;
    a reading unit that reads in the sketched image as image data;
    a data-creating unit that creates data in two-dimensional coordinates from lines included in the read-in image;
    a determining unit that mutually associates a prescribed value set in the sketched image and a prescribed value in a three-dimensional space defined in a computer, and determines a placement position, in the three-dimensional space, of the sketched image, and a viewing point position with respect to the image, so that the input specification is satisfied;
    a cross-section creating unit that maps a cross-sectional line of the sketched image into the three-dimensional space and creates a cross-sectional outer contour line in the three-dimensional space, based on the placement position and the viewing point position;
    a spatial curved line creating unit that creates a first line, included in the sketched image from which data is created, as a spatial curved line in the three-dimensional space, using the cross-sectional outer contour line in the three-dimensional space;
    a distortion-correcting unit that corrects distortion of the created spatial curved line; and
    a curved surface creating unit that creates a curved surface based on the corrected spatial curved line,
    wherein the spatial curved-line creating unit includes
    a virtual surface creating unit that creates a virtual surface by moving the cross-sectional outer contour line towards the cross-sectional line, and
    a projector that creates the spatial curved line by projecting a second line included in the sketched image onto the virtual surface from the viewing point direction.

12. The apparatus for generating three-dimensional shape data according to claim 11, wherein the process executed by the determining unit is one of
    an angle method, whereby coordinate axes set in each of the sketched image and the three-dimensional space are mutually associated; or
    a three-point method, whereby three points set in each of the sketched image and the three-dimensional space are mutually associated.

13. The apparatus for generating three-dimensional shape data according to claim 12, wherein the angle method is a two-axis method or a three-axis method.

14. The apparatus for generating three-dimensional shape data according to claim 12, wherein the three-point method is a fixed three-point method or a varying three-point method.

15. The apparatus for generating three-dimensional shape data according to claim 11, wherein the sketched image is a quarter view sketch.

16. The apparatus for generating three-dimensional shape data according to claim 11, wherein the data-creating unit includes:
 a screen display unit that displays the read-in image data on a screen, and
 a two-dimensional coordinates defining unit that defines two-dimensional coordinates in the read-in image data.

17. The apparatus for generating three-dimensional shape data according to claim 11, wherein the sketched image is only one sheet.

18. The apparatus for generating three-dimensional shape data according to claim 11, wherein the cross-sectional outer contour line in the three-dimensional space includes a first cross-sectional outer contour line including a central axis in the three-dimensional space of the sketched image, and a second cross-sectional outer contour line that orthogonally crosses the central axis in the three-dimensional space of the sketched image.

19. The apparatus for generating three-dimensional shape data according to claim 11, wherein the sketched image depicts a vehicle.

20. The apparatus for generating three-dimensional shape data according to claim 19, wherein the specification comprises basic specifications of the vehicle.

21. A non-transitory computer readable medium storing computer program, executable on a data processing device, for generating three-dimensional shape data, the computer program comprising instructions for:
 inputting a specification for a sketched image;
 reading in the sketched image as image data;
 creating data in two-dimensional coordinates from lines included in the read-in image;
 mutually associating a prescribed value set in the sketched image and a prescribed value in a three-dimensional space defined in a computer, and determining a placement position, in the three-dimensional space, of the sketched image and a viewing point position with respect to the image, so that the input specification is satisfied;
 mapping a cross-sectional line of the sketched image into the three-dimensional space and
 creating a cross-sectional outer contour line in the three-dimensional space, based on the placement position and the viewing point position;
 creating a first line, included in the sketched image from which data is created, as a spatial curved line in the three-dimensional space, using the cross-sectional outer contour line in the three-dimensional space;
 correcting distortion of the created spatial curved line; and
 creating a curved surface based on the corrected spatial curved line,
 wherein instructions for creating the spatial curved line further comprises instructions for:
 creating a virtual surface by moving the cross-sectional outer contour line towards the cross-sectional line, and
 creating the spatial curved line by projecting a second line included in the sketched image onto the virtual surface from the viewing point direction.

22. The computer readable medium according to claim 21, wherein the instructions for determining the placement position includes instructions for determining the placement position according to one of
 an angle method, whereby coordinate axes set in each of the sketched image and the three-dimensional space are mutually associated; and
 a three-point method, whereby three points set in each of the sketched image and the three-dimensional space are mutually associated.

23. The computer readable medium according to claim 22, wherein the angle method is a two-axis method or a three-axis method.

24. The computer readable medium according to claim 22, wherein the three-point method is a fixed three-point method or a varying three-point method.

25. The computer readable medium according to claim 21, wherein the sketched image is a quarter view sketch.

26. The computer readable medium according to claim 21, wherein the instructions for creating data in two dimensional coordinates further comprises:
 displaying the read-in image data on a screen, and
 defining two-dimensional coordinates in the read-in image data.

27. The computer readable medium according to claim 21, wherein the sketched image is only one sheet.

28. The computer readable medium according to claim 21, wherein the cross-sectional outer contour line in the three-dimensional space includes a first cross-sectional outer contour line including a central axis in the three-dimensional space of the sketched image, and a second cross-sectional outer contour line that orthogonally crosses the central axis in the three-dimensional space of the sketched image.

29. The computer readable medium according to claim 21, wherein the sketched image depicts a vehicle.

30. The computer readable medium according to claim 29, wherein the specification comprises basic specifications of the vehicle.

31. A method for generating three-dimensional shape data comprising:
 inputting a specification for a three-dimensional object described in a sketched image, the specification including dimensions of respective parts of the three-dimensional object and a placement position of parts constituting the three dimensional object;
 reading in the sketched image as image data;
 creating data in two-dimensional coordinates from lines included in the read-in image;
 determining a relative positional relationship, in the three-dimensional space, between the three-dimensional object described in the sketched image, a viewing point position with respect to the sketched image, and a specification box that defines a fixed coordinate axes and fixed points on the three-dimensional object in a three-dimensional space, by mutually associating a fixed coordinate axes and fixed points in the sketched image with a fixed coordinate axes the fixed points on the specification box, respectively, created based on the inputted specification;
 mapping a cross-sectional line of the sketched image into the three-dimensional space and creating a cross-sectional outer contour line in the three-dimensional space, based on the determined relative positional relationship;
 creating a first line, included in the sketched image from which data is created, as a spatial curved line in the three-dimensional space, using the cross-sectional outer contour line in the three-dimensional space;

correcting distortion of the created spatial curved line; and
creating a curved surface based on the created spatial curved line for which the distortion has been corrected wherein the creation of the spatial curved-line in three-dimensional space further comprises:
creating a virtual surface by moving the cross-sectional outer contour line towards the cross-sectional line, and
creating the spatial curved line by projecting a second line included in the sketched image onto the virtual surface from the viewing point direction.

* * * * *